United States Patent
Kawakita

(10) Patent No.: US 7,973,648 B2
(45) Date of Patent: Jul. 5, 2011

(54) REMOTE OPERATION SYSTEM

(75) Inventor: Mitsuru Kawakita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 937 days.

(21) Appl. No.: 11/907,070

(22) Filed: Oct. 9, 2007

(65) Prior Publication Data

US 2008/0088495 A1    Apr. 17, 2008

(30) Foreign Application Priority Data

Oct. 12, 2006  (JP) .................................. 2006-278327

(51) Int. Cl.
*G05B 11/01* (2006.01)
*G08C 19/16* (2006.01)
*H04L 17/02* (2006.01)
*G06F 3/02* (2006.01)
*G09G 5/00* (2006.01)
*H04N 5/44* (2006.01)

(52) U.S. Cl. ................. 340/13.24; 340/12.23; 340/12.5; 341/173; 341/174; 341/175; 341/176; 345/169; 348/725; 348/734

(58) Field of Classification Search ............ 340/825.69, 340/72; 341/176, 175; 345/169; 348/725, 348/734; 714/15–21, 750
See application file for complete search history.

(56) References Cited

U.S. PATENT DOCUMENTS

| | | | | |
|---|---|---|---|---|
| 5,819,294 A | * | 10/1998 | Chambers | 1/1 |
| 6,008,735 A | * | 12/1999 | Chiloyan et al. | 340/825.22 |
| 7,046,161 B2 | * | 5/2006 | Hayes | 340/825.69 |
| 2003/0093813 A1 | * | 5/2003 | Shintani et al. | 725/133 |
| 2004/0143847 A1 | * | 7/2004 | Suzuki et al. | 725/61 |
| 2005/0110651 A1 | * | 5/2005 | Martis et al. | 340/825.69 |
| 2005/0168658 A1 | * | 8/2005 | Woolgar et al. | 348/734 |
| 2006/0087445 A1 | * | 4/2006 | Green | 340/825.22 |

FOREIGN PATENT DOCUMENTS

| | | |
|---|---|---|
| JP | 2002-252887 | 9/2002 |
| JP | 2003-061166 | 2/2003 |
| JP | 2004-208290 | 7/2004 |
| JP | 2005-198115 | 7/2005 |

OTHER PUBLICATIONS

Video Electronics Standards Association (VESA), E-EDID Implementation Guide, Version 1.0, Jun. 4, 2001.*
VESA, The VESA Monitor, May 2005, vol. 03, Issue 04, pp. 1-3.*
VESA, VESA Standard, Oct. 2006, vol. 1, Issue 3, pp. 1-13.*

* cited by examiner

*Primary Examiner* — Daniel Wu
*Assistant Examiner* — Emily Terrell
(74) *Attorney, Agent, or Firm* — Morgan, Lewis & Bockius LLP

(57) ABSTRACT

When a television receiver is connected to a DVD player via an HDMI cable, HDMI authentication is carried out. EDID data is then acquired from the television receiver and a manufacturer name is determined. When the manufacturer name is determined to be, for example, "company A", a table indicating a correspondence relationship of manufacturer names and remote control codes is referred to and remote control codes corresponding to the determined company A are selected. The selected remote control codes are then transmitted after selection of remote control codes of the company A is carried out. Remote control codes corresponding to the manufacturer name of the company A received from the DVD player are then stored in a memory in a manner corresponding to operation key numbers allocated in advance to a plurality of operation keys at a remote control unit.

8 Claims, 5 Drawing Sheets

REMOTE OPERATION SYSTEM

This application is based on Japanese Patent Application No. 2006-278327 filed on Oct. 12, 2006, the contents of which are hereby incorporated by reference.

BACKGROUND OF THE INVENTION

1. Field of the Invention

The present invention relates to a remote operation system where a main apparatus (for example, a digital video disc (DVD) player) and another auxiliary apparatus (for example, a television receiver) connected to the main apparatus via a cable of a predetermined interface (for example, a high definition multimedia interface (HDMI)) can be operated remotely using a single remote control unit.

2. Description of Related Arts

Apparatuses that are operated using a remote control unit such as DVD players that playback information recorded on a DVD that is an optical disc, DVD recorders that record/playback information to and from a DVD, television receivers, or the like can each be remotely operated by their own respective remote control units. The number of operation keys is more numerous for remote control units for apparatuses with a large number of functions. There is therefore a demand for such remote control units to be shared so that a number of apparatuses may be operated using a single remote control unit. For example, since the DVD player has more functions than the television receiver, when the television receiver is connected to a DVD player and if the television receiver is then operated using the remote control unit belonging to the DVD player, it is possible to operate the DVD player and the television receiver using a single remote control unit.

JP-A-2002-252887 discloses a related technology in which remote control format data, command data, and key display data that controls each apparatus is read in from a plurality of apparatuses connected using a digital interface. The read-in data is then provided to a remote control transmitter and setting of an arrangement of key commands and displaying of key names is carried out. Further, model classification information, manufacturer, and model name information is acquired for a plurality of apparatuses using a serial bus. This information is then provided to a remote control unit paired with remote control data. Information for an apparatus subject to control can then be displayed in detail. In short, in this related technology, remote control data is extracted via a digital interface. This remote control data is then transmitted directly or indirectly (via a memory card) to a remote control transmitter (remote control unit) and stored. The stored remote control data is then read out and setting of a remote control format, command code, and key display of a remote control unit is carried out based on this remote control data. As a result, it is possible to customize a remote control transmitter in an extremely straightforward manner.

However, with the related technology disclosed in JP-A-2002-252887, remote control data is extracted via a digital interface. This remote control data is then transmitted directly to a remote control transmitter (remote control unit) and stored. However, it is not possible to confirm whether the stored remote control data is the desired remote control data set at the remote control transmitter. In this related technology, when, for example, a television receiver is connected as a display apparatus to a visual apparatus such as, for example, a DVD player, it is not possible to also operate the television receiver using the single remote control unit belonging to the DVD player. It is therefore no longer possible to operate the television receiver if the remote control unit belonging to the television receiver is lost.

In a related technology disclosed in JP-A-2004-208290, when a number of audio visual (AV) apparatuses such as a set top box and DVD player etc. are connected to a display (display apparatus), operations are carried out using remote control units corresponding to each connected apparatus. This means that in this related technology also, it is not possible to operate a television receiver using a single remote control unit belonging to a DVD player when, for example, a television receiver is connected as a display apparatus to, for example, a DVD player taken as a visual apparatus. It is therefore also not possible to then operate the television receiver when the remote control unit belonging to the television receiver is lost.

Further, in a related technology disclosed in JP-A-2005-198115, remote control unit control codes are read in utilizing a learning function when control codes matching an auxiliary visual apparatus are not stored in the memory of the remote control unit. However, in this related technology, there are substantially more DVD player functions for operating a DVD player etc. using this remote control unit compared to television receiver functions when the remote control unit is the remote control unit originally belonging to the television receiver. It is therefore necessary to increase the number of operation keys for this remote control unit. This means that the remote control unit itself has to be remade.

SUMMARY OF THE INVENTION

In order to solve the problems described above, it is an object of the present invention to provide a remote operation system taking an apparatus originally having a larger number of functions as a main apparatus (DVD player, etc.) and taking an apparatus that has fewer functions and is connected to the main apparatus as another auxiliary apparatus (television receiver etc.), where it is possible for the auxiliary apparatus to be operated using a remote control unit of the main apparatus.

In order to achieve this object, in the present invention, in remote operation system where a main apparatus and an auxiliary apparatus connected to the main apparatus via a predetermined interface cable are capable of being remotely operated by a single remote control unit, the main apparatus is provided with a connection determination section for determining whether or not a connection between the main apparatus and the auxiliary apparatus via the predetermined interface cable is established, an authentication processing section for carrying out authentication of the predetermined interface when it is determined that the connection is established, an identification data acquiring section for acquiring identification data of a predetermined format including specific information from the auxiliary apparatus when a remote control code setting mode is set and after the authentication is completed, a specific information determination section for determining specific information specific to the auxiliary apparatus from the identification data that is acquired, a remote control code selecting section for selecting a set of remote control codes corresponding to the specific information determined to be specific to the auxiliary apparatus by referring to a table showing a correspondence relationship between the specific information specific to the auxiliary apparatus and the set of remote control codes, and an apparatus-side remote control code transmission control section for transmitting the set of remote control codes that is selected to the remote control unit. The remote control unit is provided with a remote control unit-side remote control code receiving control section for allowing the remote control unit to receive the set of remote control code from the main apparatus when the remote control setting mode is set, and a remote control code storage section for storing in a memory the set of remote control codes corresponding to the specific information specific to the auxiliary apparatus received, the set of remote control codes being stored in the memory in a manner corresponding to operation key numbers allocated in advance to a plurality of operation keys.

According to this configuration, by taking an apparatus originally having a larger number of functions as a main apparatus (DVD player, etc.) and taking an apparatus that has fewer functions and is connected to the main apparatus as another auxiliary apparatus (television receiver etc.), with it being possible for the auxiliary apparatus to be operated using a remote control unit of the main device, use of the remote control unit for the main apparatus (DVD player etc.) is possible even when the remote control unit of the auxiliary apparatus (television receiver etc.) is lost. This improves ease of use. This means that only one remote control unit is necessary when the main apparatus and the auxiliary apparatus are sold together and reductions in cost can therefore be achieved.

DETAILED DESCRIPTION OF PREFERRED EMBODIMENTS

Figure 1:
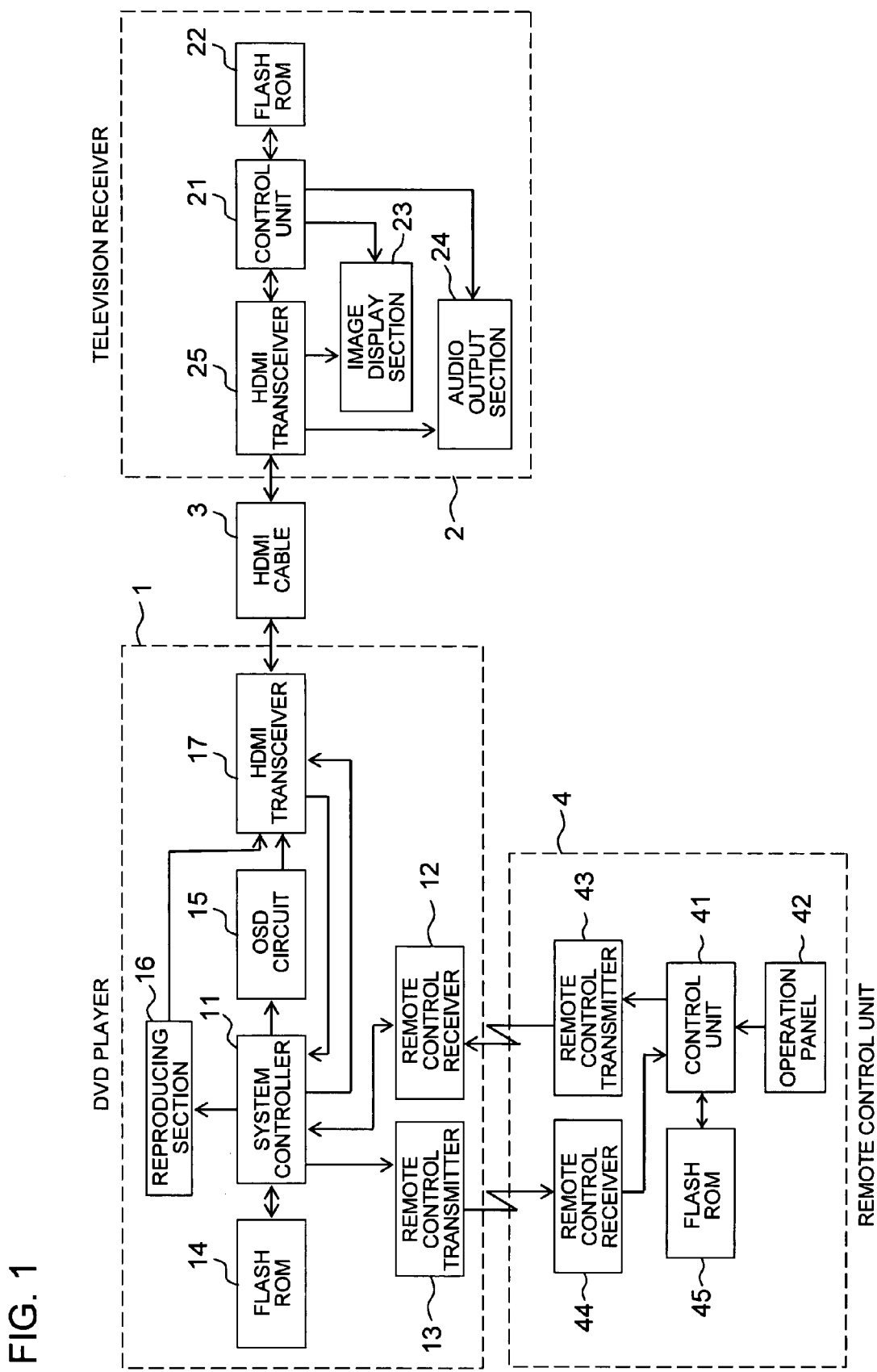
FIG. 1 is a block view showing a configuration for a remote operation system of an embodiment of the present invention.

An embodiment of the present invention will now be described with reference to the attached drawings. FIG. 1 is a block view showing a configuration for a remote operation system of an embodiment of the present invention. In this embodiment, a description is given taking a DVD player as a main apparatus to be operated (hereinafter referred to simply as "main apparatus") and a television receiver as an auxiliary apparatus to be operated (hereinafter referred to simply as "auxiliary apparatus"). However, the present invention is by no means limited in this respect. For example, the main apparatus may also be a DVD recorder, hard disk recorder, or another audio visual apparatus, and the auxiliary apparatus may be a monitor apparatus provided with an image display unit and audio output unit.

In FIG. 1, a DVD player 1 is provided with a system controller 11 including a microcomputer etc. for controlling the player as a whole, a remote control receiver 12 for receiving remote control codes sent by a remote control unit 4, a remote control transmitter 13 for transmitting operation key numbers and remote control codes for operation keys of an operation panel 42 of the remote control unit 4 to the remote control unit 4, a flash read-only memory (ROM) 14 for storing a table indicating a correspondence relationship of specific information (for example, manufacturer name, product code, serial number) for a television receiver 2 taken as an auxiliary apparatus connected by using an HDMI (High Definition Multimedia Interface) cable 3 and remote control codes, an OSD (On Screen Display) circuit 15 displaying character information on the television receiver 2, a reproducing section 16 for playing back information recorded on DVD and CD, and an HDMI transceiver 17 for communicating with the television receiver 2 via the HDMI cable 3.

The television receiver 2 is provided with a control unit 21 including a microcomputer for controlling the television receiver as a whole, a flash ROM 22 for storing EDID (Extended Display Identification Data) etc. having identification data of a predetermined format including a control program for the control unit 21 and specific information for the television receiver, an image display section 23 including image circuits and display apparatus etc. for displaying images, an audio output section 24 comprised of an audio circuit and speakers etc., for outputting audio, and an HDMI transceiver 25 for carrying out communication with the DVD player 1 via the HDMI cable 3.

The remote control unit 4 is provided with a control unit 41 including a microcomputer for providing overall control of the remote control process, the operation panel 42 provided with a plurality of operation keys, allocated in advance with operation key numbers, for remotely operating the DVD player 1, etc., a remote control transmitter 43 for transmitting remote control codes corresponding to the operation keys of the operation panel 42 to the DVD player 1, a remote control receiver 44 for receiving remote control codes sent from the DVD player 1, and a flash ROM 45 for storing a plurality of remote control codes in addresses corresponding to the operation key numbers of the operation keys of the operation panel 42. This remote control unit 4 has a function for learning waveforms of remote control codes from the DVD player 1.

Figure 2:
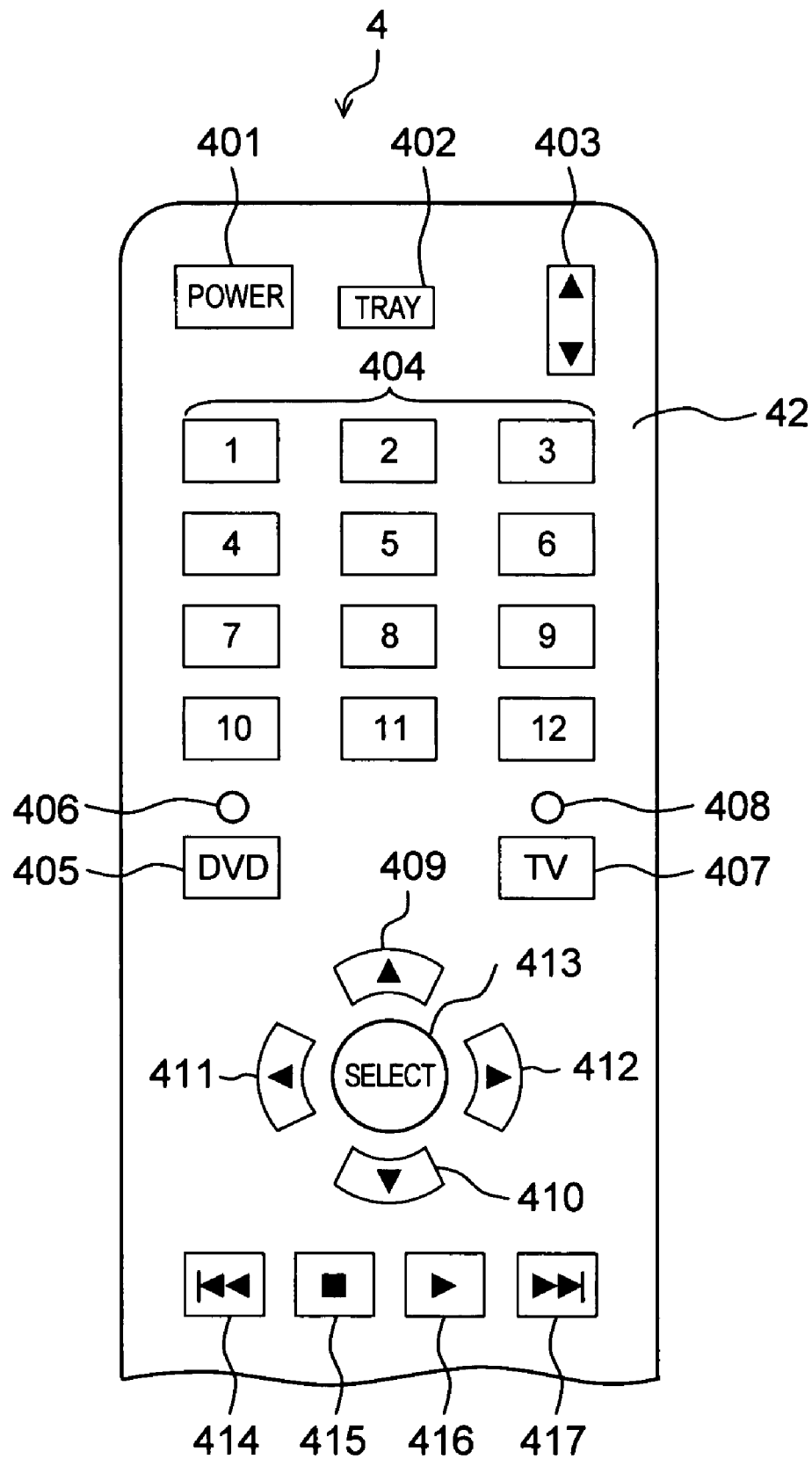
FIG. 2 shows an example of a key arrangement of a remote control unit in the embodiment.

FIG. 2 shows an example of a key arrangement of the remote control unit in this embodiment. In FIG. 2, a power key 401, a tray open/close key 402, a volume key 403, a plurality of numeric keys 404, a DVD mode switching key 405, a DVD mode confirmation LED (Light Emitting Diode) 406, a TV mode switching key 407, a TV mode confirmation LED (Light Emitting Diode) 408, an up key 409, a down key 410, a left key 411, a right key 412, a select key 413, a fast reverse key 414, a pause key 415, a reproduction key 416, and a fast forward key 417 are arranged at the operation panel 42 of the remote control unit 4. The arrangement of the keys in this case is merely provided as an example and is by no means limiting.

Figure 3:
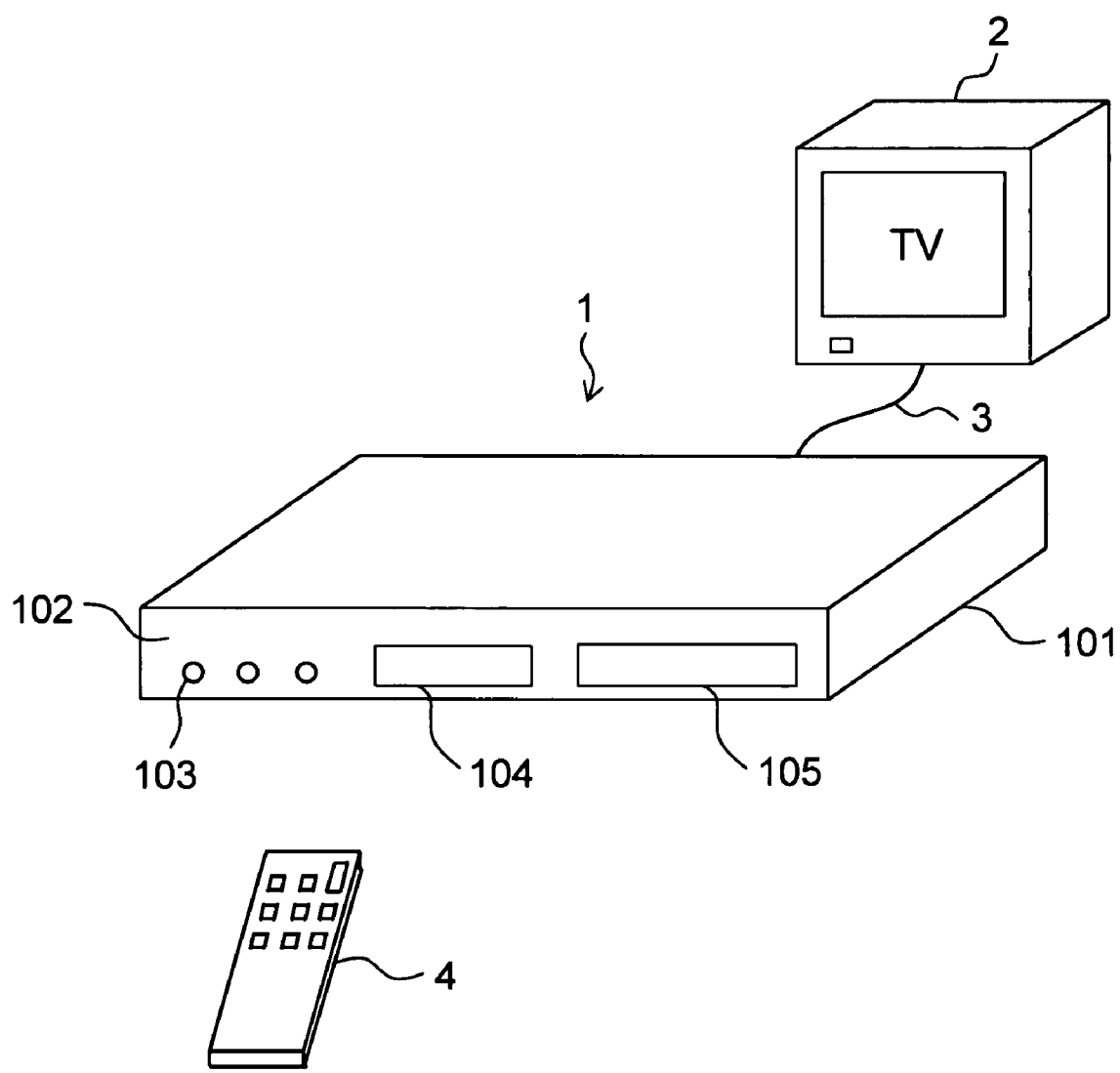
FIG. 3 is a simplified perspective view of a configuration for a remote operation system of the embodiment.

FIG. 3 is a simplified perspective view of a configuration for a remote operation system of this embodiment. In FIG. 3, a power key 103, a tray 104 for inserting a DVD or CD, and a display section 105 etc. are provided on a casing operation panel 102 at a front surface of a casing 101 in the DVD player 1. The arrangement of the elements of the configuration is provided merely as an example and is by no means limiting.

Figure 4:
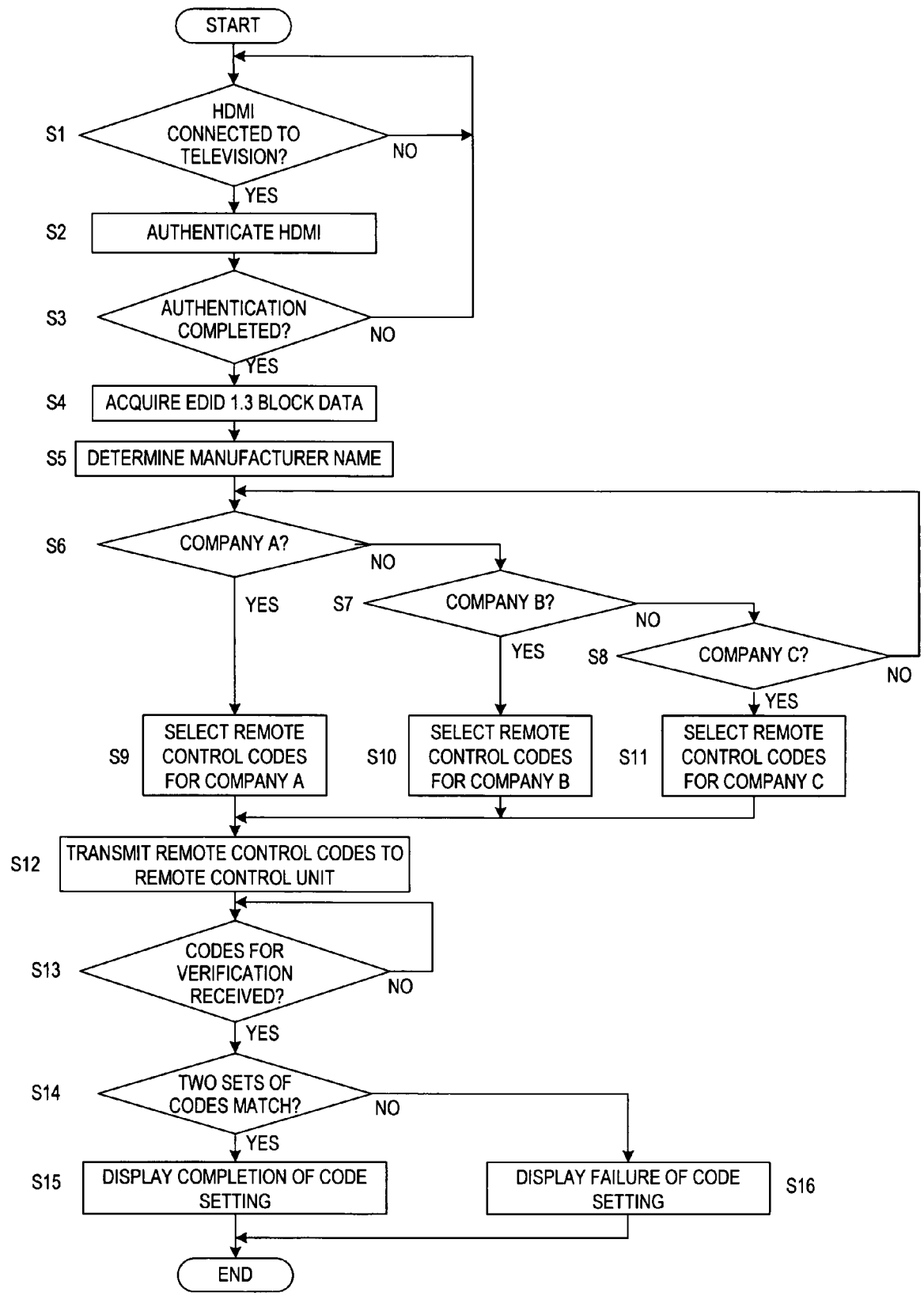
FIG. 4 is a flowchart illustrating processing for setting remote control codes enabling a television receiver to also be operated using a single remote control unit to the remote control unit when a television receiver is connected to a DVD player of the embodiment.
Figure 5:
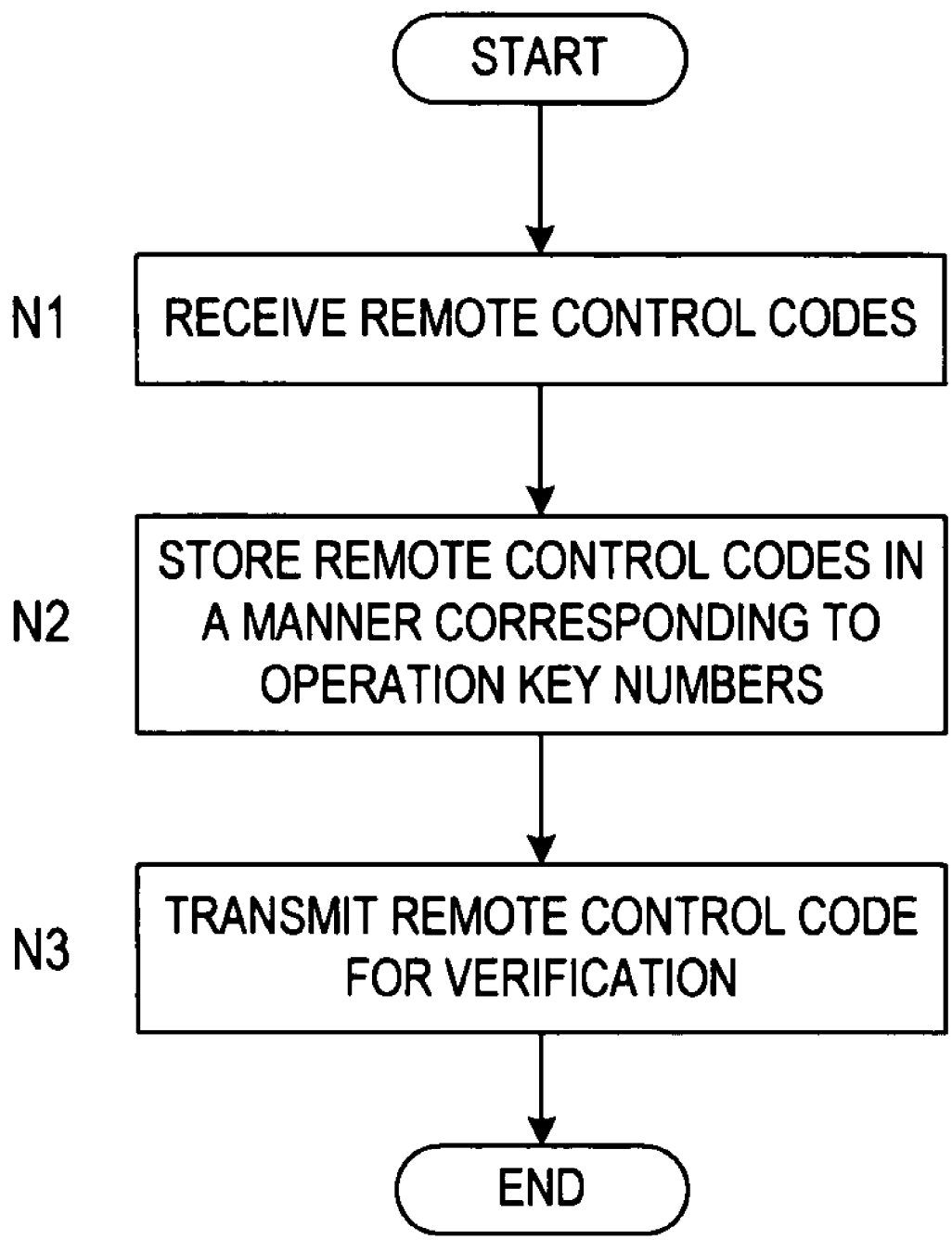
FIG. 5 is a flowchart illustrating processing when remote control unit commands are received from the DVD player at the remote control unit of the embodiment.

FIG. 4 is a flowchart illustrating processing for setting remote control codes enabling a television receiver to also be operated using a single remote control unit to the remote control unit when a television receiver is connected to a DVD player of this embodiment. FIG. 5 is a flowchart illustrating processing when remote control codes are received from the DVD player by the remote control unit of this embodiment. A description is now given of processing relating to setting of remote control codes with reference to the flowcharts and with reference to FIG. 1 to FIG. 3.

First, when the television receiver 2 is connected to the DVD player 1 via the HDMI cable 3, connection information is inputted to the system controller 11 via the HDMI transceiver 17 of the DVD player 1. As a result, a connection determination section of the system controller 11 detects that the DVD player 1 is connected by an HDMI to the television receiver 2 (step S1 in FIG. 4). The authentication processing section of the system controller 11 then carries out HDMI authentication (step S2). In the case of setting to remote control code setting mode, when an identification data acquiring section determines that the authentication is complete (step S3), EDID 1.3 Block data is acquired from the television receiver 2 (step S4). The remote control setting mode is set at the DVD player 1 but it is also possible for setting to take place at the remote control unit 4. The EDID 1.3 Block data (identification data) is stored in the flash ROM 22 of the television receiver 2. In the EDID 1.3 Block data, a Manufacturer Name ID is stored in an address 08h, a Product Code ID is stored in an address 0Ah, and a Serial Number ID is stored in an address 0Ch.

Namely, an identification data acquiring section of the system controller 11 provides instructions for reading the EDID 1.3 Block data from the flash ROM 22 to the control unit 21 via the HDMI transceiver 17, the HDMI cable 3, and the HDMI transceiver 25 of the television receiver 2. In response to this instruction, the control unit 21 reads out the EDID 1.3 Block data from the flash ROM 22, and transmits the EDID 1.3 Block data to the HDMI cable 3 via the HDMI transceiver 25. The identification data acquiring section of the system controller 11 of the DVD player 1 acquires the EDID 1.3 Block data via the HDMI transceiver 17.

It is therefore possible to find the manufacturer name, the product code, and the serial number of the television receiver because the Manufacturer Name ID, the Product Code ID, and the Serial Number ID of the television receiver 2 are included in the EDID 1.3 Block data. When the same remote control codes are used regardless of the product for television receivers of the same manufacturer, the remote control codes for the television receiver 2 can be understood from just the manufacturer name. It is therefore possible for a specific information determination section of the system controller 11 to determine the name of the manufacturer of a television receiver from the acquired EDID 1.3 Block data (step S5).

When remote control codes are different depending on the product even for television receivers by the same manufacturer, the remote control codes used in the television receiver can be understood if the Product Code ID can be determined in addition to the Manufacturer Name ID. Further, when remote control codes are different depending on the product and the serial number even for television receivers by the same manufacturer, the remote control codes used in the television receiver can be understood if the Product Code ID and the Serial Number ID can be determined in addition to the Manufacturer Name ID.

When results for the determination of a manufacturer name in step S5 are that it is determined that the Manufacturer Name of the television receiver 2 is "company A" (step S6), the remote control code selecting section of the system controller 11 refers to a table indicating a correlation relationship of manufacturer names and remote control codes stored in the flash ROM 14. Remote control codes corresponding to the determined manufacturer name "company A" are then selected (step S9). Further, when the manufacturer name is determined to be "company B" (step S7), the remote control code selecting section of the system controller 11 refers to the table and selects remote control codes corresponding to the determined manufacturer name "company B" (step S10).

Moreover, when the manufacturer name is determined to be "company C" (step S8), the remote control code selecting section of the system controller 11 refers to the table and selects remote control codes corresponding to the determined manufacturer name "company C" (step S11).

After selection of remote control commands is carried out for "company A", "company B", or "company C", a remote control code transmission control unit of the system controller 11 inputs the selected remote control codes into the remote control transmitter 13. As a result, the remote control transmitter 13 transmits the selected remote control codes to the remote control unit 4 as remote control codes of an optical signal (step S12).

When it is set to the remote control code setting mode, a remote control code receiving control unit of the control unit 41 of the remote control unit 4 receives the remote control codes of an optical signal transmitted from the DVD player 1 by using the remote control receiver 44 (step N1 in FIG. 5) and converts the optical signal remote control codes into electrical signal remote control codes. A remote control code storage section of the control unit 41 stores the remote control codes corresponding to the operation key numbers allocated in advance to the plurality of operation keys of the operation panel 42 and corresponding to the manufacturer name (company A, company B, or company C) received from the DVD player 1 in the flash ROM 45 (step N2). The remote control code transmission control unit of the control unit 41 transmits the received remote control codes using the remote control transmitter 43 in order to verify whether or not the remote control codes received from the DVD player 1 are correct (step N3).

When the DVD player 1 is set to the remote control code setting mode, the remote control code receiving control unit of the system controller 11 receives the remote control codes transmitted from the remote control unit 4 for verification using the remote control unit receiver 12. When receipt of the remote control codes for verification is detected (step S13), a remote control code determination section of the system controller 11 determines whether or not the remote control codes for verification and remote control codes sent by the remote control code transmitter 13 match (step S14). The transmitted remote control codes are stored temporarily in the flash ROM 14. If the remote control codes sent from the flash ROM 14 are then read out therefrom and compared with the remote control codes for verification, it is possible to determine whether or not the two sets of remote control codes match.

When it is determined that the two sets of remote control codes match, a message display section of the system controller 11 reads out message data indicating completion of remote control code setting stored in advance in the flash ROM 14. The message data is then subjected to OSD processing by the OSD circuit 15 and is transmitted to the HDMI cable 3 via the HDMI transceiver 17. The message data indicating the completion of remote control code setting is received by the HDMI transceiver 25 in the television receiver 2. The control unit 21 then displays the message indicating the completion of remote control code setting at the image display section 23 that is a display apparatus (step S15).

On the other hand, when it is determined that the two sets of remote control codes do not match, the message display section of the system controller 11 reads out message data indicating failure of remote control code setting stored in advance in the flash ROM 14. The message data is then subjected to OSD processing by the OSD circuit 15 and is transmitted to the HDMI cable 3 via the HDMI transceiver 17. Message data indicating the failure of remote control code setting is received by the HDMI transceiver 25 in the television receiver 2. The control unit 21 then displays the message indicating the failure of remote control code setting at the image display section 23 that is a display apparatus (step S16).

As a result of the processing described above, when the DVD mode switching key 405 is pressed down, the remote control unit 4 already set with the remote control codes operates the DVD player 1, and when the TV mode switching key 407 is pressed down, the remote control unit 4 operates the television receiver 2. Further, the DVD mode confirmation LED 406 is displayed when DVD mode is set, and the TV mode confirmation LED 408 is displayed when TV mode is set. It is therefore possible to know the current mode of the remote control unit 4, which provides ease of use for the user.

As described above, according to this embodiment, it is possible to also operate a television receiver using a remote control unit for a DVD player. This means that it is possible to use a remote control unit for a DVD player when a remote control unit for a television receiver has been lost, which brings about ease of use. Cost reductions can also be made because it is sufficient to provide only one remote control unit when a DVD player and a television receiver are sold together. Further, it is possible to verify whether or not setting of remote control codes has been carried out correctly at the remote control unit. This increases the reliability of setting remote control codes to the remote control unit.

What is claimed is:

1. A remote operation system where a main apparatus and an auxiliary apparatus connected to the main apparatus via a predetermined interface cable are capable of being remotely operated by a single remote control unit,
   wherein the main apparatus comprises:
   a connection determination section for determining whether or not a connection between the main apparatus and the auxiliary apparatus via the predetermined interface cable is established;
   an authentication processing section for carrying out authentication of the predetermined interface when it is determined that the connection is established;
   an identification data acquiring section for acquiring identification data of a predetermined format including specific information from the auxiliary apparatus when a remote control code setting mode is set and after the authentication is completed;
   a specific information determination section for determining specific information specific to the auxiliary apparatus from the identification data that is acquired;
   a remote control code selecting section for selecting a set of remote control codes corresponding to the specific information determined to be specific to the auxiliary apparatus by referring to a table showing a correspondence relationship between the specific information specific to the auxiliary apparatus and the set of remote control codes; and
   an apparatus-side remote control code transmission control section for transmitting the set of remote control codes that is selected to the remote control unit, and
   wherein the remote control unit comprises:
   a remote control unit-side remote control code receiving control section for allowing the remote control unit to receive the set of remote control codes from the main apparatus when the remote control setting mode is set;
   a remote control code storage section for storing in a memory the set of remote control codes corresponding to the specific information specific to the auxiliary apparatus received, the set of remote control codes being stored in the memory in a manner corresponding to operation key numbers allocated in advance to a plurality of operation keys; and
   a remote control unit-side remote control code transmission control section for sending the set of remote control codes received by the remote control unit to the main apparatus for verification to see whether or not the set of remote control code received by the remote control unit is correct, and
   wherein the main apparatus further comprises:
   an apparatus-side remote control code receiving control section for receiving the set of remote control codes from the remote control unit when the remote control setting mode is set;
   a remote control code determination section for determining whether or not the set of remote control codes received for verification from the remote control unit and the set of remote control codes transmitted from the main apparatus match; and
   a message display section for displaying a message indicating that remote control setting has completed on a display when it is determined that two of the sets of remote control codes match, and displaying a message indicating that remote control setting has failed on the display when it is determined that the two of the sets of remote control codes do not match.

2. The remote operation system according to claim 1, wherein the specific information is a manufacturer name for the auxiliary apparatus.

3. The remote operation system according to claim 1, wherein the specific information is a manufacturer name and a product code for the auxiliary apparatus.

4. The remote operation system according to claim 1, wherein the specific information is a manufacturer name, a product code, and a serial number for the auxiliary apparatus.

5. The remote operation system according to claim 1, wherein the identification data of the predetermined format is stored in a memory of the auxiliary apparatus in line with Extended Display Identification Data format.

6. The remote operation system according to claim 1, wherein the predetermined interface is a High Definition Multimedia Interface.

7. The remote operation system according to claim 1, wherein the table is stored in advance in a non-volatile memory of the main apparatus.

8. The remote operation system according to claim 1, wherein the main apparatus is a DVD player and the auxiliary apparatus is a television receiver.

* * * * *